United States Patent
Umetsu

(10) Patent No.: US 11,204,131 B2
(45) Date of Patent: Dec. 21, 2021

(54) HIGH PRESSURE VESSEL

(71) Applicant: HONDA MOTOR CO., LTD., Tokyo (JP)

(72) Inventor: Kenta Umetsu, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 25 days.

(21) Appl. No.: 16/669,875

(22) Filed: Oct. 31, 2019

(65) Prior Publication Data
US 2020/0141538 A1 May 7, 2020

(30) Foreign Application Priority Data
Nov. 2, 2018 (JP) .............................. JP2018-207023

(51) Int. Cl.
*F17C 1/00* (2006.01)

(52) U.S. Cl.
CPC ........ *F17C 1/00* (2013.01); *F17C 2201/0109* (2013.01); *F17C 2203/0604* (2013.01); *F17C 2203/067* (2013.01); *F17C 2203/0624* (2013.01); *F17C 2221/012* (2013.01); *F17C 2270/0184* (2013.01)

(58) Field of Classification Search
CPC .... F17C 1/00; F17C 1/005; F17C 2201/0109; F17C 2201/0104; F17C 2201/01; F17C 2203/00; F17C 2203/0602; F17C 2203/06; F17C 2203/0604; F17C 2203/0624; F17C 2203/0621
See application file for complete search history.

(56) References Cited

U.S. PATENT DOCUMENTS 9,879,825 B2 * 1/2018 Kaneko .................. F17C 1/16
2018/0045371 A1   2/2018 Lee

FOREIGN PATENT DOCUMENTS

| CN | 1908501 A | * | 2/2007 |
|----|-----------|---|--------|
| CN | 1908501 A |   | 2/2007 |
| CN | 102939496 A |   | 2/2013 |
| CN | 107701913 A |   | 2/2018 |
| JP | 2010-249147 A |   | 11/2010 |

(Continued)

OTHER PUBLICATIONS

Office Action dated Sep. 15, 2020 issued over the corresponding Japanese Patent Application No. 2018-207023 with the English translation thereof.

(Continued)

*Primary Examiner* — Steven A. Reynolds
*Assistant Examiner* — Javier A Pagan
(74) *Attorney, Agent, or Firm* — Carrier Blackman & Associates, P.C.; William D. Blackman; Joseph P. Carrier

(57) ABSTRACT

A high pressure vessel includes a liner that includes: a trunk section; and a converging section positioned in an end section of the high pressure vessel. A reinforced layer as a fiber layer is formed on an outer wall of the liner. This reinforced layer includes: an inner laminated section and an outer laminated section that have a low helical layer laminated therein; and an intermediate laminated section that interposes between these inner laminated section and outer laminated section. The intermediate laminated layer is configured having alternately formed therein: at least one layer of a hoop layer; and at least one layer of a high helical layer.

8 Claims, 7 Drawing Sheets

(56) References Cited

FOREIGN PATENT DOCUMENTS

JP          2020-020420 A       2/2020

OTHER PUBLICATIONS

Office Action including search report dated Mar. 3, 2021 issued over the corresponding Chinese Patent Application No. 201911060433.5 with the English translation of pertinent portion.
Office Action including search report dated Aug. 16, 2021 issued over the corresponding Chinese Patent Application No. 201911060433.5 with the English machine translation thereof.

* cited by examiner (LOW HELICAL WINDING)

$\theta \fallingdotseq 10°$ (HIGH HELICAL WINDING)

θ ≅ 50°

FIG. 5 (HIGH HELICAL WINDING)
θ ≒ 75°

HIGH PRESSURE VESSEL

CROSS-REFERENCE TO RELATED APPLICATION

This application is based upon and claims the benefit of priority from Japanese Patent Application No. 2018-207023 filed on Nov. 2, 2018, the contents of which are incorporated herein by reference.

BACKGROUND OF THE INVENTION

Field of the Invention

The present invention relates to a high pressure vessel in which a fiber is wound around an outer wall of a liner.

Description of the Related Art

In order to cause a fuel cell to generate electricity, a fuel gas such as a hydrogen gas needs to be supplied to an anode. Therefore, in, for example, a fuel cell vehicle installed with a fuel cell, a high pressure vessel for resupplying the hydrogen gas is installed. This high pressure vessel is configured by: a liner as a vessel main body; and a reinforced layer surrounding an outer wall of the liner. The liner is configured from a resin material such as a polyamide or high density polyethylene, and the reinforced layer is configured from a fiber-reinforced resin (an FRP), for example.

The reinforced layer configured from the FRP is generally formed by a reinforced fiber impregnated with a resin being wound a plurality of times around the outer wall of the liner, after which the resin is hardened by heating. Now, a hoop layer or a helical layer is formed due to a difference in winding direction of the reinforced fiber. Various studies have been made regarding which portion of the reinforced layer the hoop layer or helical layer should be formed in, from a viewpoint of sufficiently securing pressure-resisting strength of the liner. For example, Japanese Laid-Open Patent Publication No. 2010-249147 proposes that an inner peripheral side of the reinforced layer ("an inner layer of an FRP layer" referred to in Japanese Laid-Open Patent Publication No. 2010-249147) is configured solely as a helical layer inclining at a certain angle with respect to a longitudinal direction of the high pressure vessel.

SUMMARY OF THE INVENTION

A high helical layer having a large inclination angle cannot be wound around a converging section being an end section of the high pressure vessel. Therefore, in conventional technology described in Japanese Laid-Open Patent Publication No. 2010-249147, a configuration is adopted whereby the high helical layer and the low helical that has a small inclination angle, are alternately wound around. However, actually, it is not easy for helical layers whose inclination angles differ greatly to be alternately wound around, and a layer referred to as a transit layer needs to be inserted in an intervening manner between the helical layers. This transit layer does not contribute in any way to pressure-resisting strength, so even though the number of layers of the reinforced fiber (a thickness of the reinforced layer) increases and the high pressure vessel thereby increases in size, securing of pressure-resisting strength due to the transit layer cannot be expected.

A main object of the present invention is to provide a high pressure vessel that enables weight lightening and downsizing, and securing of pressure-resisting strength, to be simultaneously achieved.

Due to an embodiment of the present invention, there is provided a high pressure vessel that includes a liner, the liner including: a trunk section; and a converging section positioned in an end section of the high pressure vessel, the high pressure vessel having a fiber layer formed therein by a fiber being wound a plurality of times around an outer wall of the liner, the fiber layer respectively including, on its inner peripheral side being a winding start and on its outer peripheral side being a winding end, an inner laminated section and an outer laminated section that have low helical layers laminated therein, and an intermediate laminated section being interposed between the inner laminated section and the outer laminated section, the intermediate laminated section configured by at least one hoop layer and at least one high helical layer, which are alternately formed, an inclination angle of the high helical layer with respect to a longitudinal direction of the trunk section being larger compared to that of the low helical layer.

The low helical layer configuring the inner laminated section or the outer laminated section sufficiently covers the converging section. It therefore becomes possible for pressure-resisting strength of the converging section to be secured. On the other hand, particularly the hoop layer of the intermediate laminated section contributes to securing of pressure-resisting strength of the trunk section.

Furthermore, since the inner laminated section and the outer laminated section are configured solely by the low helical layer, there is no need for a transit layer to be provided in these inner laminated section and outer laminated section. This is because inclination angles will never differ greatly within the inner laminated section and within the outer laminated section, so winding around will never get difficult either. Moreover, since inclination angles of the hoop layer and the high helical layer do not greatly differ, there is no particular need for a transit layer to be provided in the intermediate laminated section either.

Thus, in the present invention, transit layers that do not contribute to pressure-resisting strength can be made fewer. Proportionately, an increase in thickness of the fiber layer is avoided, so downsizing and weight lightening of the high pressure vessel can be achieved.

In the hoop layer (or the high helical layer) and the low helical layer, intersection angles with respect to a longitudinal direction of the high pressure vessel differ greatly. Accordingly, an inclination angle of the low helical layer configuring the inner laminated section preferably becomes larger as number of layers increases. As a result, an angular difference of an uppermost low helical layer of the inner laminated section and a lowermost layer of the intermediate laminated section can be reduced. It hence becomes easy to switch from the inner laminated section to the intermediate laminated section at a time of winding around of the fiber.

For similar reasons, an inclination angle of the low helical layer configuring the outer laminated section preferably becomes smaller as number of layers increases. This is because in this case, an angular difference of an uppermost layer of the intermediate laminated section and a lowermost low helical layer of the outer laminated section can be reduced, so it becomes easy to switch from the intermediate laminated section to the outer laminated section at a time of winding around of the fiber.

Moreover, a difference in inclination angles of mutually adjacent low helical layers configuring the inner laminated section or the outer laminated section is preferably not more than 20°. In the case of configuring in this way, it becomes difficult for interlayer detachment to occur between low helical layers, even when a cycle of discharging and filling of a high pressure fluid is repeated or when a large impact is applied to the high pressure vessel. Hence, pressure-resisting strength can be maintained over a long period and also when an impact has been applied.

Furthermore, change in inclination angle of the low helical layer configuring the inner laminated section and change in inclination angle of the low helical layer configuring the outer laminated section are preferably substantially symmetrical. By configuring in this way, pressure-resisting strength in the converging sections of both ends is secured to substantially the same extent.

Moreover, an end section of the hoop layer configuring the intermediate laminated section preferably shifts in a direction of separating from the converging section as number of layers of the intermediate laminated section increases.

The high pressure vessel configured as above is suitable for being installed in a fuel cell vehicle to store hydrogen to be supplied to an anode electrode of a fuel cell.

Due to the present invention, a configuration is adopted whereby while pressure-resisting strength of the converging section is secured by configuring the inner laminated section and the outer laminated section by the low helical layer, pressure-resisting strength of the trunk section is secured particularly by the hoop layer of the intermediate laminated section. Moreover, since there is no particular need for a transit layer to be provided in each of the inner laminated section, the intermediate laminated section, and the outer laminated section, an increase in thickness of the fiber layer is proportionately avoided, so downsizing and weight lightening of the high pressure vessel can be achieved.

By thus adopting the above-described configuration, weight lightening and downsizing of the high pressure vessel, and securing of pressure-resisting strength of the high pressure vessel, can be simultaneously achieved.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of a high pressure vessel according to the present invention will be presented and described in detail below with reference to the accompanying drawings.

Figure 1:
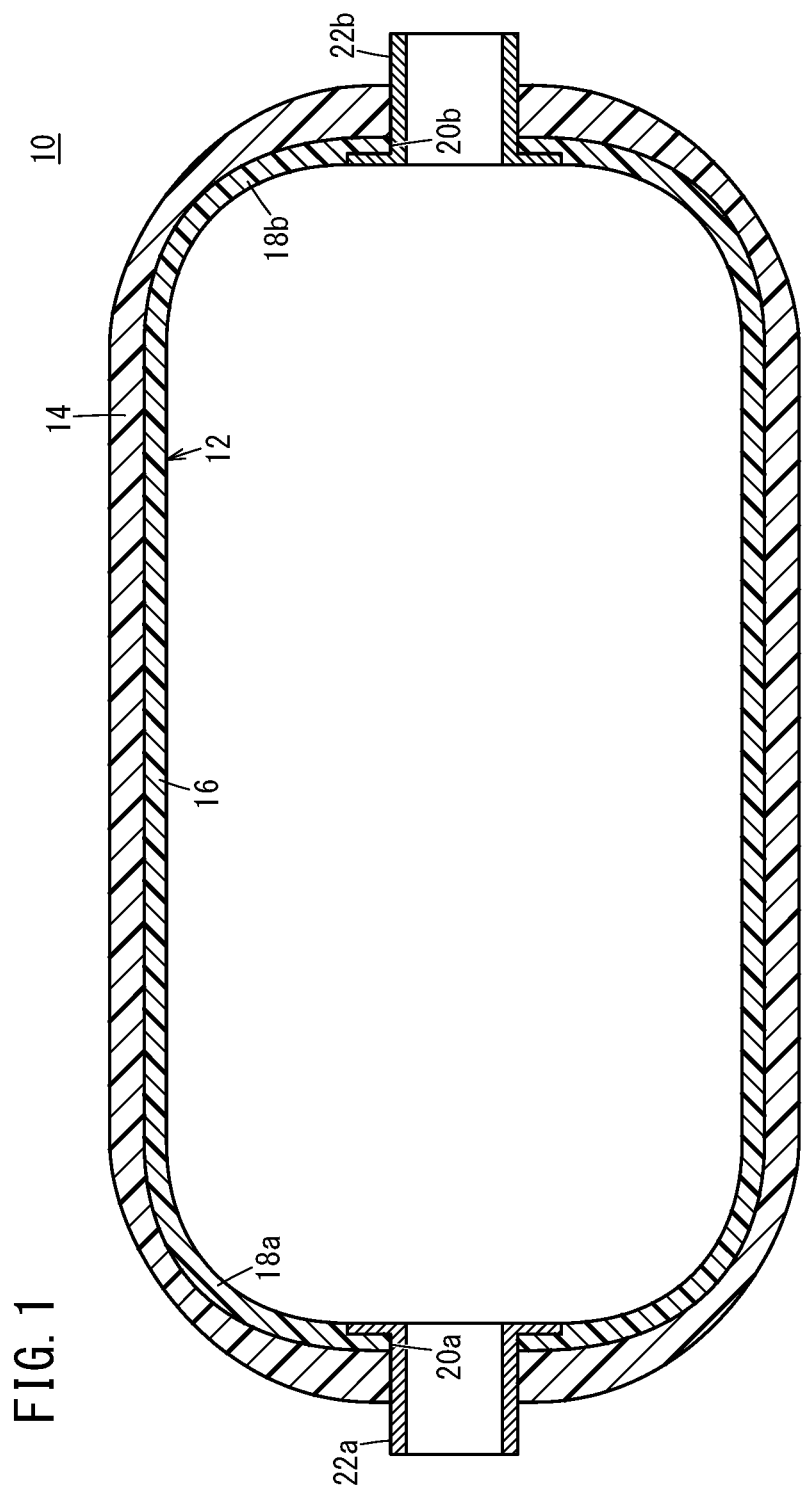
FIG. 1 is a schematic overall cross-sectional view taken along a longitudinal direction of a high pressure vessel according to an embodiment of the present invention.

FIG. 1 is a schematic overall cross-sectional view taken along a longitudinal direction of a high pressure vessel 10 according to the present embodiment. This high pressure vessel 10 is installed in a fuel cell vehicle along with a fuel cell, and is filled at high pressure with a hydrogen gas to be supplied to an anode of the fuel cell, for example.

The high pressure vessel 10 includes: a liner 12; and a reinforced layer 14 (a fiber layer) that covers the liner 12. The liner 12 is configured from a high density polyethylene (HDPE) resin showing hydrogen barrier properties, for example. In this case, since HDPE resin is easily-worked and low-priced, there is an advantage that the liner 12 can be manufactured easily and at low cost. Moreover, since HDPE resin excels in strength and rigidity, sufficient pressure resistance is secured in the liner 12.

The liner 12 includes: a hollow trunk section 16 having a substantially cylindrical shape; and a first dome section 18a and a second dome section 18b as converging sections provided at both ends of the trunk section 16 so as to gradually converge. Although in the present embodiment, an inner diameter and an outer diameter of the trunk section 16 are substantially constant, a configuration may be adopted whereby they have their diameters reduced or expanded in a tapered manner as the first dome section 18a and/or the second dome section 18b is approached.

Openings 20a, 20b are respectively formed in the first dome section 18a and the second dome section 18b. At least one of these openings 20a, 20b is provided with a cap 22a, 22b to which there is connected piping (not illustrated) for supplying the hydrogen gas to the anode or for resupplying the hydrogen gas from a hydrogen resupply source. Tips of the caps 22a, 22b are exposed from the reinforced layer 14.

Figure 2:
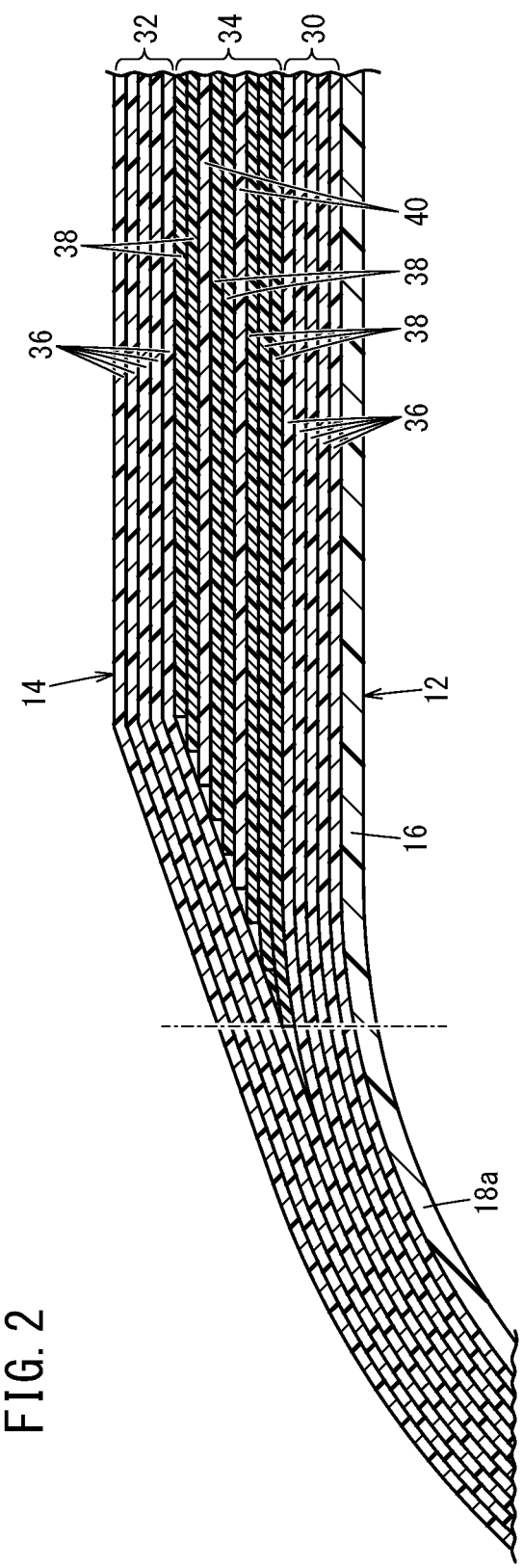
FIG. 2 is a principal part enlarged cross-sectional view showing details of a reinforced layer.

The reinforced layer 14 is formed from a fiber-reinforced resin (FRP) in which a reinforced fiber is impregnated with a resin base. That is, the reinforced layer 14 is a laminated body formed by the reinforced fiber impregnated with a resin (hereafter, also written as "impregnated fiber") being wound around a plurality of times by a publicly-known filament winding method, after which the resin hardens by heating, for example. Hence, as shown in FIG. 2, the reinforced layer 14 includes: an inner laminated section 30 on an inner peripheral side formed at a winding start of the impregnated fiber; an outer laminated section 32 on an outer peripheral side formed at a winding end of the impregnated fiber; and an intermediate laminated section 34 interposing between the inner laminated section 30 and the outer laminated section 32. Note that the one dot-chain line in FIG. 2 indicates a boundary of the first dome section 18a and the trunk section 16.

Figure 3:
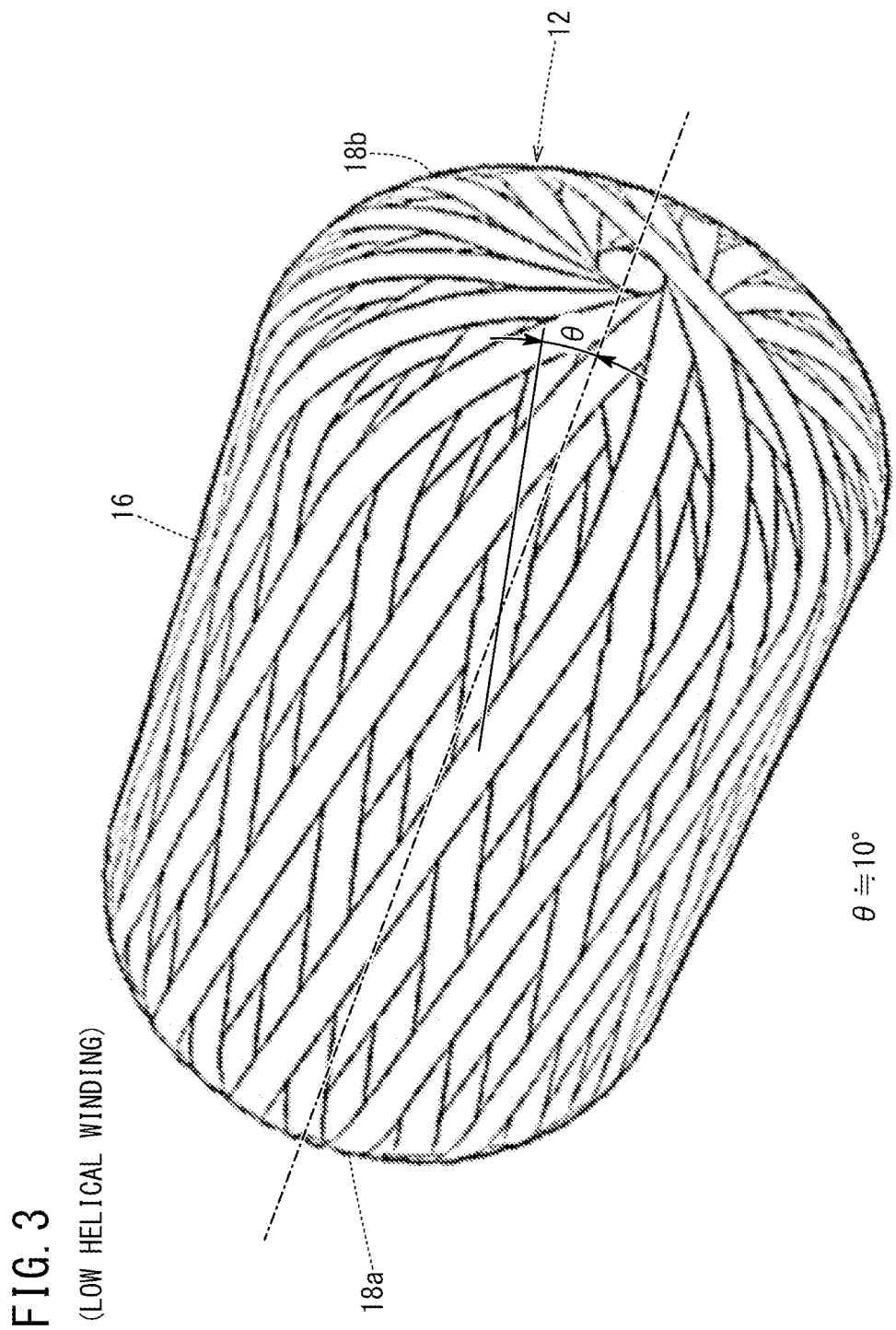
FIG. 3 is a schematic perspective view showing a state of an impregnating resin having been wound around a liner by low helical winding.

The inner laminated section 30 and the outer laminated section 32 are configured from a laminated body of low helical layers 36 formed by the impregnated fiber undergoing low helical winding. Now, helical winding refers to a way of winding where, as shown in FIG. 3, the impregnated fiber is wound around in such a manner that its extension direction inclines at a certain inclination angle θ with respect to a longitudinal direction of the trunk section 16 of the liner 12. In the present specification, "low helical winding" indicates the case where the inclination angle θ is not more than approximately 40°. FIG. 3 exemplifies the case where the inclination angle θ is approximately 10°. Moreover, "high helical winding" in the present specification refers to the case where the inclination angle θ is more than approximately 40°.

Figure 4:
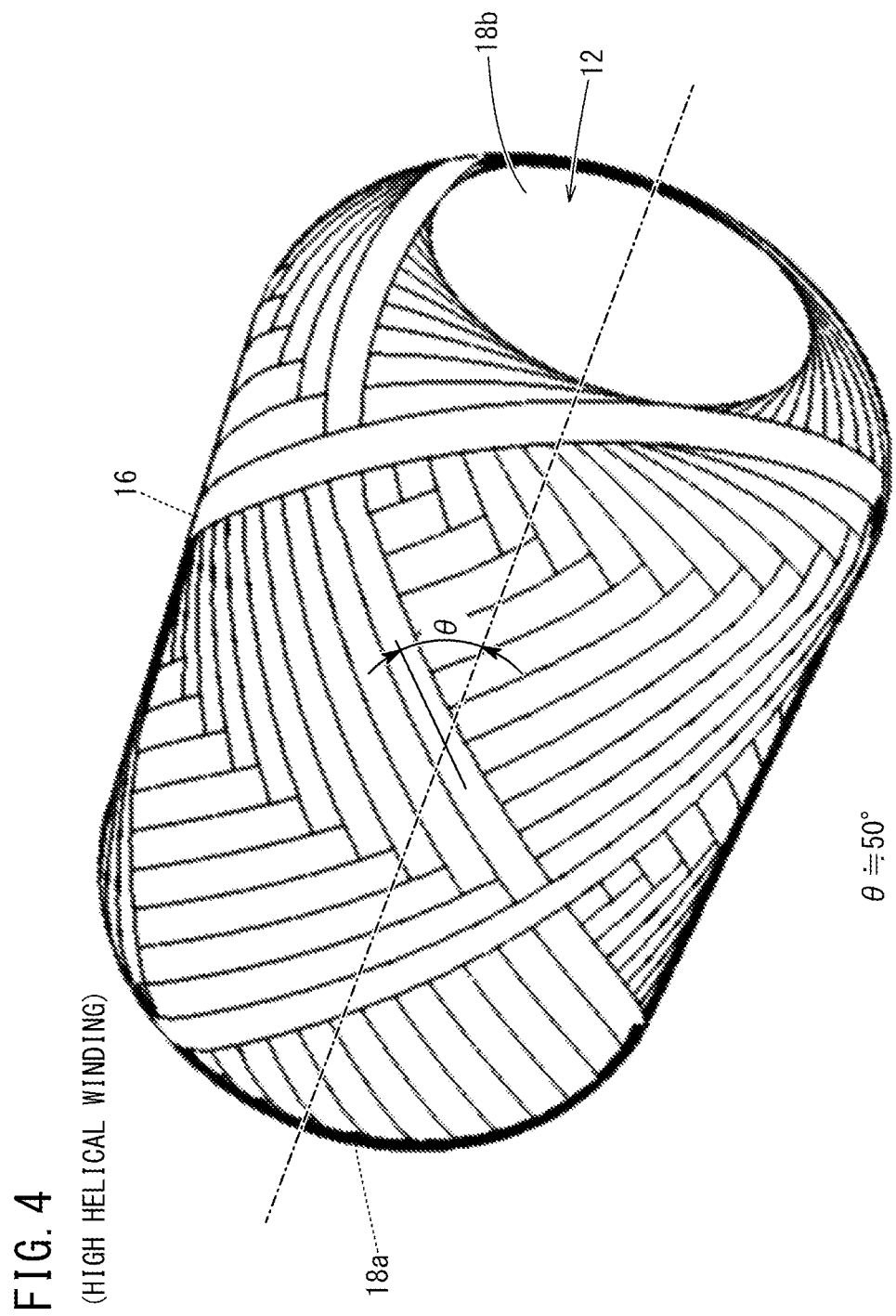
FIG. 4 is a schematic perspective view showing a state of an impregnating resin having been wound around a liner by high helical winding.
Figure 5:
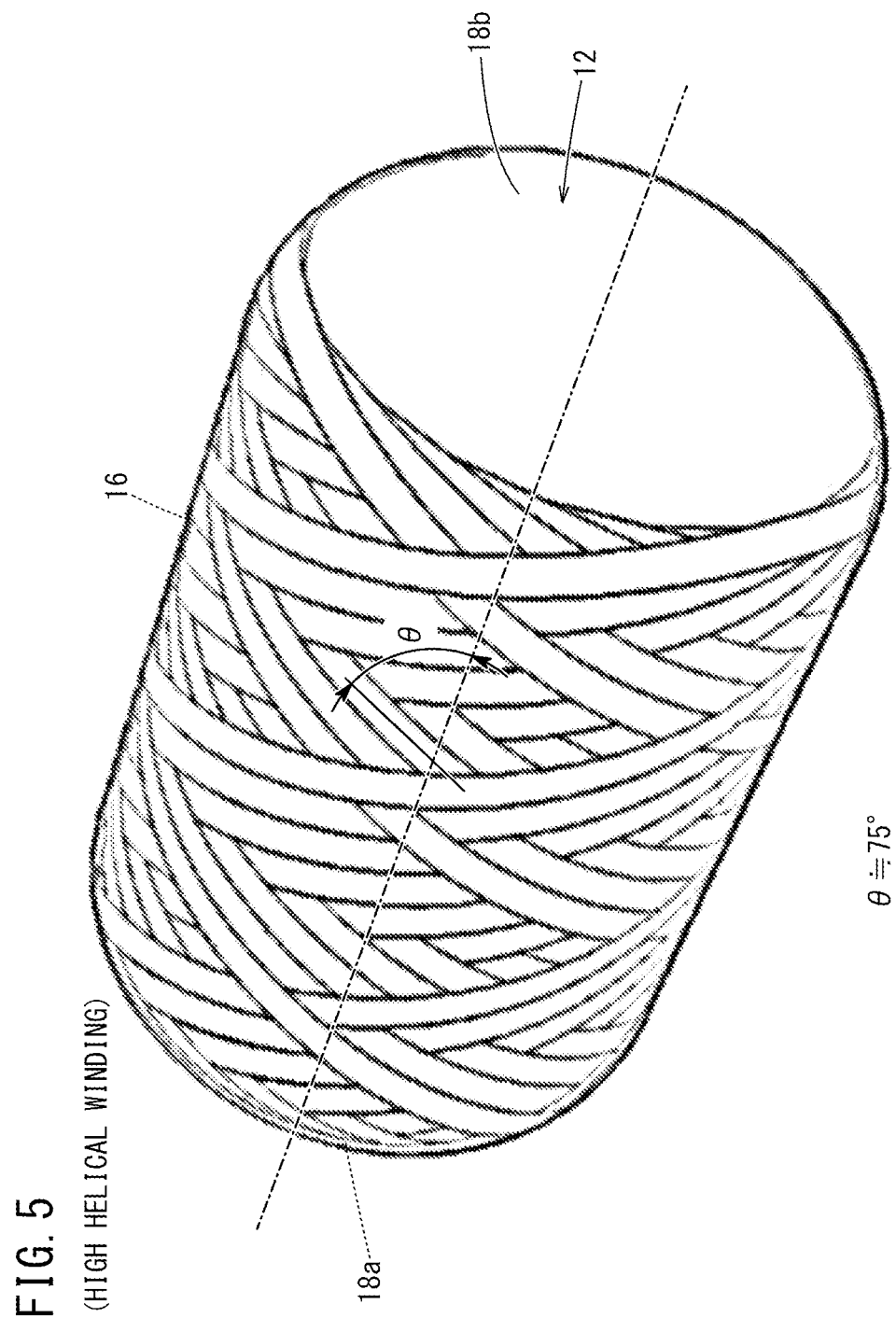
FIG. 5 is a schematic perspective view showing a state of an impregnating resin having been wound around a liner by high helical winding in which an inclination angle has been made even larger than in FIG. 4.

Cases where the impregnated fiber has been wound around with the inclination angle θ set to approximately 50° and approximately 75° are respectively indicated in FIGS. 4 and 5. Comparing FIGS. 3 to 5, it is found that the larger the inclination angle becomes, the larger an exposed area of the first dome section 18a (or the second dome section 18b) becomes, in other words, the more difficult it becomes for the first dome section 18a (or the second dome section 18b) to be covered with the impregnated fiber by high helical winding.

In the present embodiment, as described above, it is arranged that the inner laminated section 30 and the outer laminated section 32 be configured by a laminated body of the low helical layers 36. Therefore, the first dome section 18a and the second dome section 18b are covered with the impregnated fiber, and their exposed areas are minute compared to when high helical winding is performed (refer to FIG. 3). Hence, pressure-resisting strength of the first dome section 18a and the second dome section 18b is secured.

The intermediate laminated section 34 interposing between the inner laminated section 30 and the outer laminated section 32 is a mixed laminated layer of a hoop layer 38 formed by the impregnated fiber undergoing hoop winding, and a high helical layer 40 formed by the impregnated fiber undergoing high helical winding. Note that hoop winding refers to a way of winding where the impregnated fiber is wound around in such a manner that its extension direction is substantially orthogonal to the longitudinal direction of the trunk section 16 of the liner 12. Pressure-resisting strength of the trunk section 16 is secured by this intermediate laminated section 34, particularly the hoop layer 38.

The hoop layer 38 and the high helical layer 40 are alternately laminated. That is, there is a repetition of the hoop layer 38, the high helical layer 40, the hoop layer 38, the high helical layer 40, and the hoop layer 38, for example. Alternatively, a configuration may be adopted whereby a plurality of the hoop layers 38 are laminated, after which a plurality of the high helical layers 40 are laminated, and a plurality of the hoop layers 38 are further laminated. In other words, "alternately" includes not only the case where the hoop layer 38 and the high helical layer 40 are switched every single layer, but also the case where a plurality of the high helical layers 40 being formed after a plurality of the hoop layers 38 have been formed is repeated. Ultimately, the intermediate laminated section 34 is configured by at least one layer of the hoop layer 38 and at least one layer of the high helical layer 40, which are alternately formed.

In this case, the winding start and the winding end of the intermediate laminated section 34 are the hoop layers 38. That is, a boundary of the inner laminated section 30 and the intermediate laminated section 34, and a boundary of the intermediate laminated section 34 and the outer laminated section 32 are recognized by presence of the hoop layer 38. Note that a transit layer is preferably provided between an uppermost low helical layer 36 of an inner layer and the hoop layer 38 (a lowermost layer of the intermediate laminated section 34), and between the hoop layer 38 (an uppermost layer of the intermediate laminated section 34) and a lowermost low helical layer 36 of an outer layer.

A part of the high helical layer 40 is wound around the first dome section 18a or the second dome section 18b. Hence, as shown in FIG. 2, an end section of the hoop layer 38 shifts in a direction of separating from the first dome section 18a or the second dome section 18b as the number of layers of the intermediate laminated section 34 increases.

Figure 6:
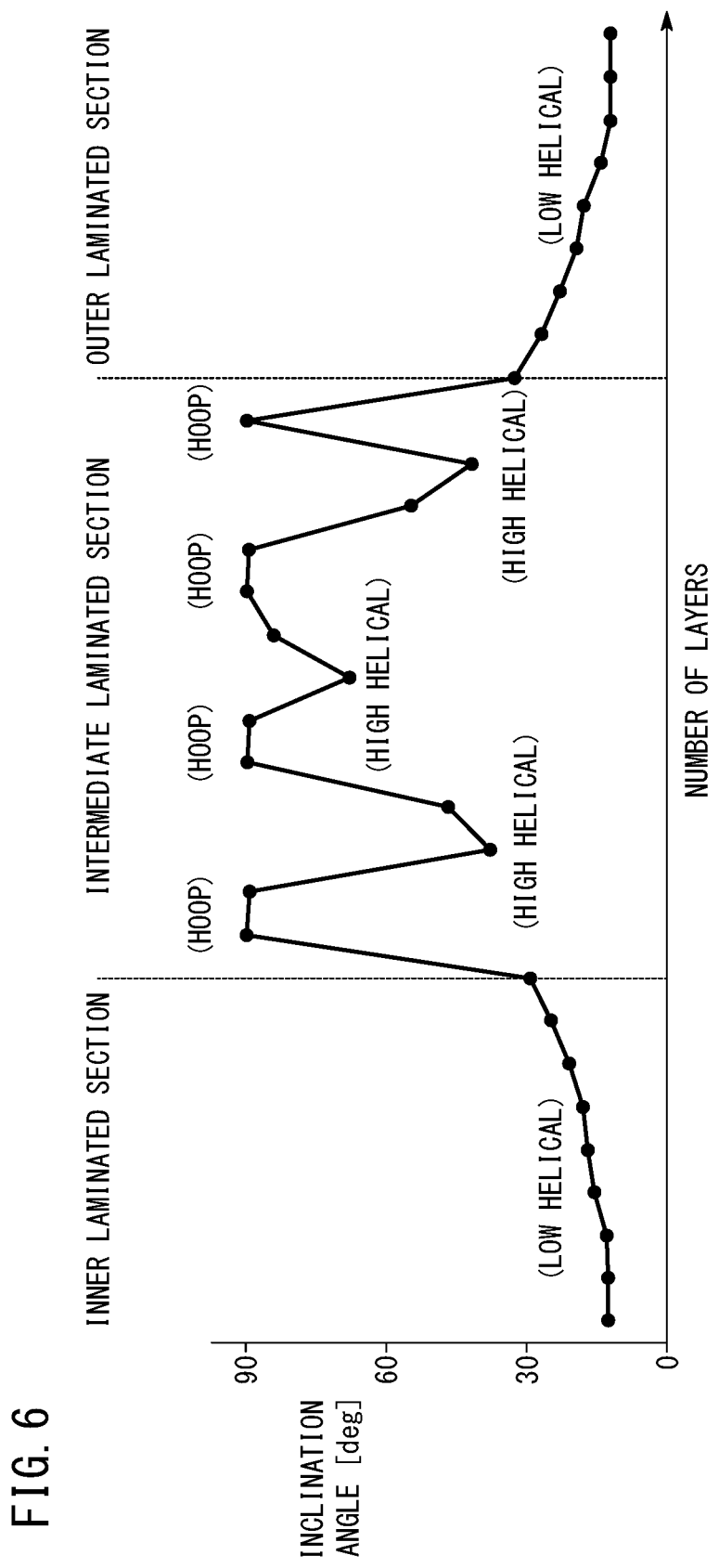
FIG. 6 is a graph showing change in inclination angle of a resin-impregnated reinforced fiber.

One example of change in the inclination angle θ of the impregnated fiber in the reinforced layer 14 configured as above is shown in FIG. 6 with the number of layers as the horizontal axis. However, the transit layer is disregarded.

As may be understood from this FIG. 6, in the present embodiment, the inclination angle θ of the low helical layer 36 of the inner laminated section 30 is made larger as the number of layers increases. That is, a difference between the inclination angle θ of an uppermost low helical layer 36 of the inner laminated section 30 and the inclination angle θ of a lowermost high helical layer 40 of the intermediate laminated section 34 is comparatively small. Therefore, there is no need for the transit layer that makes no contribution to pressure-resisting strength to be provided between the inner laminated section 30 and the intermediate laminated section 34. As a result, it can be avoided that thickness of the reinforced layer 14 increases or that the high pressure vessel 10 resultantly becomes large-sized and heavy-weight.

Moreover, the inclination angle θ of the low helical layer 36 of the outer laminated section 32 is made smaller as the number of layers increases. Hence, a difference between the inclination angle θ of an uppermost high helical layer 40 of the intermediate laminated section 34 and the inclination angle θ of a lowermost low helical layer 36 of the outer laminated section 32 is comparatively small. Therefore, since there is no need for the transit layer to be provided between the intermediate laminated section 34 and the outer laminated section 32, it can be avoided that the reinforced layer 14 becomes thick or that the high pressure vessel 10 becomes large-sized and heavy-weight.

Moreover, in the inner laminated section 30 and the outer laminated section 32, a difference in inclination angles θ of adjacent low helical layers 36 is set to not more than 20°. That is, in the inner laminated section 30 and the outer laminated section 32, the inclination angle θ of the low helical layer 36 changes gradually. It can therefore be avoided that detachment occurs between layers due to a load being applied to the reinforced layer 14 from outside.

Figure 7:
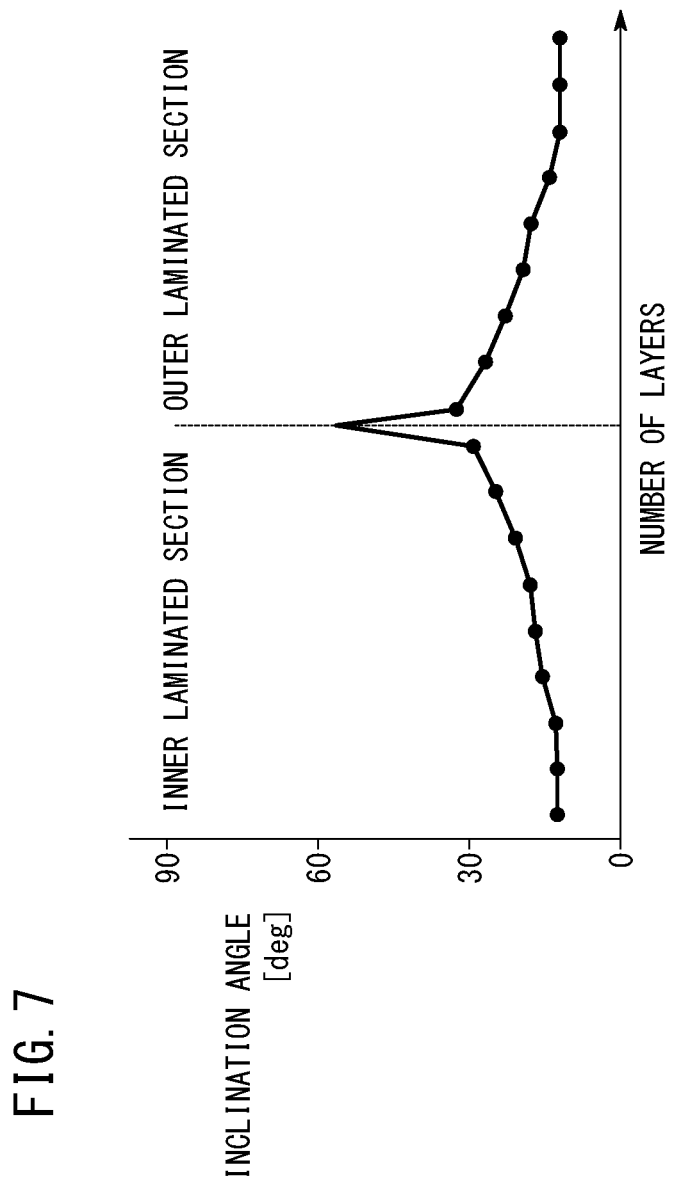
FIG. 7 is a graph of an inner laminated section and an outer laminated section extracted from FIG. 6.

For the above kinds of reasons, change in inclination angle θ of the low helical layer 36 in the inner laminated section 30 and change in inclination angle θ of the low helical layer 36 in the outer laminated section 32 will be substantially symmetrical as shown in FIG. 7 that shows the inner laminated section 30 and the outer laminated section 32 extracted from FIG. 6.

Now, there is no particular need for the inclination angle to be changed every single layer of the low helical layers 36, and a configuration may be adopted whereby at least one layer of the low helical layers 36 having the same inclination angle is formed, and then at least one layer of the low helical layers 36 having a different inclination angle is formed. In this case, "a difference in inclination angles of mutually adjacent low helical layers 36" is assumed to indicate low helical layers 36 that are adjacent to each other and whose inclination angles differ.

Furthermore, when the difference in inclination angle θ is set as described above, it becomes difficult for detachment between low helical layers 36, that is, interlayer detachment to occur when a cycle of discharging and filling of high pressure hydrogen is repeated or when a large impact is applied to the high pressure vessel 10. Therefore, pressure-resisting strength secured by the reinforced layer 14 can be maintained over a long period and also when an impact has been applied. In other words, a high pressure vessel 10 having excellent cycle characteristics and impact-resisting characteristics is obtained.

Due to the present embodiment, as indicated above, pressure-resisting strength of the first dome section 18*a* and the second dome section 18*b* can be secured while the number of layers of transit layers is made fewer, so weight lightening and downsizing of the high pressure vessel 10 can be achieved, and an improvement in productivity due to filament winding can be achieved. Moreover, while pressure-resisting strength of the first dome section 18*a* and the second dome section 18*b* is secured by the low helical layer 36 of the inner laminated section 30 and the outer laminated section 32, pressure-resisting strength of the trunk section 16 can be secured particularly by the hoop layer 38 of the intermediate laminated section 34. Ultimately, it is possible to achieve securing of pressure-resisting strength of the high pressure vessel 10, simultaneously to achieve weight lightening and downsizing of the high pressure vessel 10.

The present invention is not specifically limited to the above-described embodiment, and may be variously changed in a range not departing from the gist of the present invention.

For example, this high pressure vessel 10 may be configured to be employed in an application other than being installed in a fuel cell vehicle.

What is claimed is:

1. A high pressure vessel that includes a liner, the liner including: a trunk section; and a converging section positioned in an end section of the high pressure vessel, the high pressure vessel having a fiber layer formed therein by a fiber being wound a plurality of times around an outer wall of the liner, the fiber layer respectively including, on its inner peripheral side being a winding start and on its outer peripheral side being a winding end, an inner laminated section and an outer laminated section that have low helical layers laminated therein, and an intermediate laminated section interposed between the inner laminated section and the outer laminated section, the intermediate laminated section comprising at least two hoop layers and at least one high helical layer disposed between the two hoop layers, wherein an inclination angle of the high helical layer, with respect to a longitudinal direction of the trunk section, is larger than an inclination angle of the low helical layer.

2. The high pressure vessel according to claim 1, wherein an inclination angle of the low helical layer configuring the inner laminated section becomes larger as number of layers increases.

3. The high pressure vessel according to claim 1, wherein an inclination angle of the low helical layer configuring the outer laminated section becomes smaller as number of layers increases.

4. The high pressure vessel according to claim 1, wherein a difference in inclination angles of mutually adjacent low helical layers configuring the inner laminated section or the outer laminated section is not more than 20°.

5. The high pressure vessel according to claim 1, wherein change in inclination angle of the low helical layer configuring the inner laminated section and change in inclination angle of the low helical layer configuring the outer laminated section are substantially symmetrical.

6. The high pressure vessel according to claim 1, wherein an end section of the hoop layer configuring the intermediate laminated section shifts in a direction of separating from the converging section as number of layers of the intermediate laminated section increases.

7. The high pressure vessel according to claim 1, wherein the high pressure vessel is configured to be installed in a fuel cell vehicle.

8. The high pressure vessel according to claim 1, wherein the low helical layers have an inclination angle less than 40 degrees, and wherein the high helical layers have an inclination angle of 40 degrees or greater.

* * * * *